Jan. 5, 1932.   H. C. JENKS   1,839,559
CONTROL SYSTEM
Filed March 24, 1928
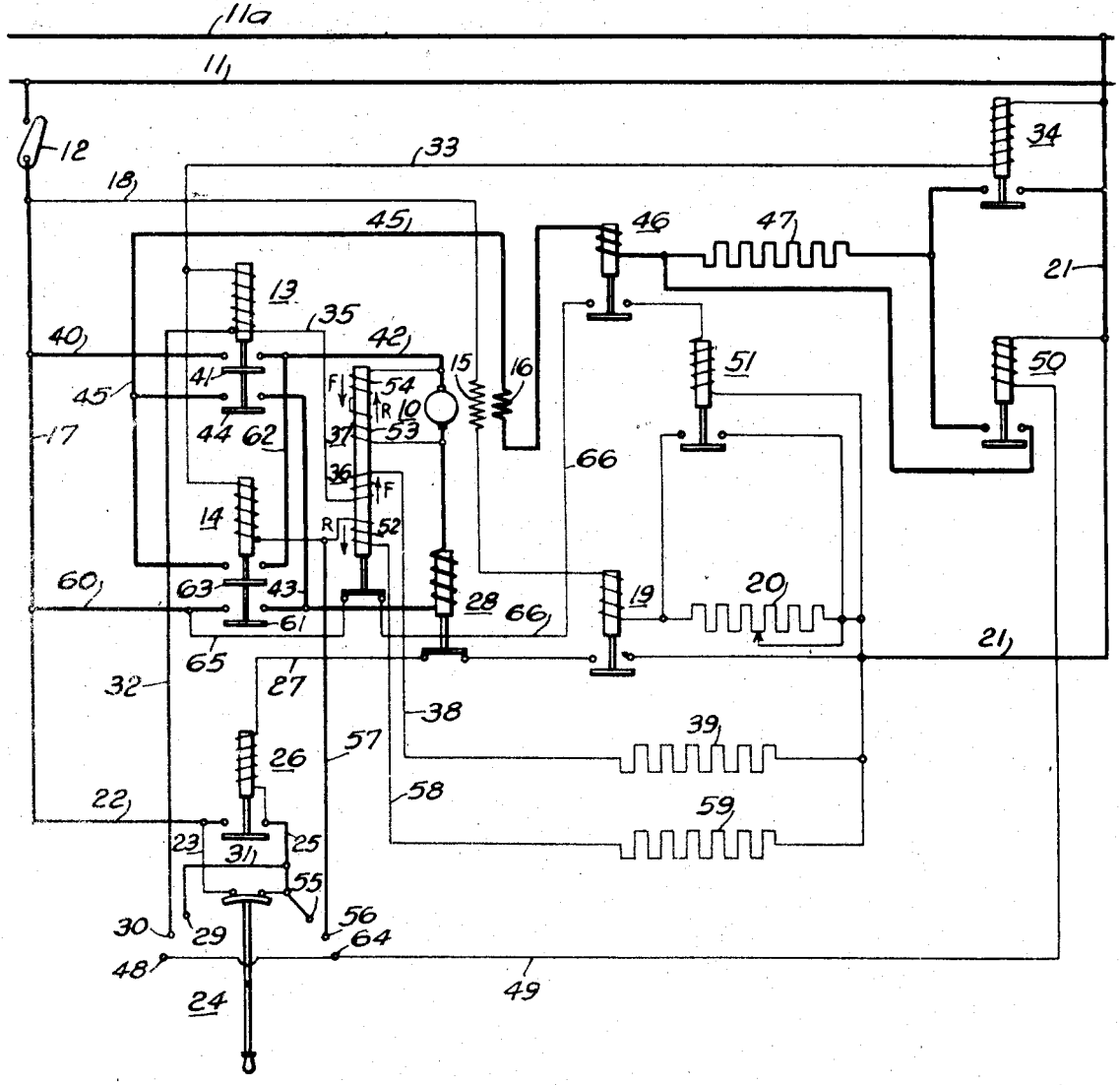
INVENTOR
Harold C. Jenks.
BY
ATTORNEY Patented Jan. 5, 1932

1,839,559

UNITED STATES PATENT OFFICE

HAROLD C. JENKS, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed March 24, 1928. Serial No. 264,317.

My invention relates generally to control systems for electric motors and particularly to the control of reversible direct-current motors.

In certain applications of direct-current motors, it is desirable to have a control system suitable for plugging the motor, that is to say, reversing the circuit connections to the armature while the motor is in rotation, so that power is applied which tends to rotate the armature in a direction opposite to that in which it is actually rotating. This operation, however, produces a mechanical shock in the machine and, if the change of connections is effected under a field of greater strength than the previous running strength, this shock may do considerable damage to the machine. For this reason, it is desirable to provide a control system in which the field is automatically maintained at this running strength when the plugging connections are established.

The object of my invention, generally stated, is to provide a system of control of the above-indicated character which shall be simple in its connections and positive in its operation.

A more specific object of my invention is to provide a system of control which will permit the plugging of a motor while operating at high speed in one direction in order to quickly reverse its direction of rotation.

A further object of my invention is to provide a system of control in which the field strength of a motor is not changed upon plugging.

Another object of my invention is to provide a method of control for a variable-speed motor by automatic adjustment of the field excitation in accordance with the armature current.

Other objects of my invention will be apparent to those skilled in the art when the following description is read in conjunction with the accompanying diagram.

The single figure of the drawing is a diagrammatic view of a control system for an electric motor in which the various elements are connected in accordance with my invention.

A reversible motor 10 is disposed to be connected to the positive direct-current supply conductor 11 through a main switch 12 and remotely-controlled directional switches 13 and 14. A shunt field winding 15 and a series field winding 16 are provided for the motor 10. It is possible to close only one of the directional switches 13 and 14 at one time and, when it is desired to reverse the direction of current through the armature of the motor 10, one directional switch may be opened and the other directional switch may be actuated to its closed position, thereby establishing the required connections.

In order to connect the motor 10 for operation in either direction, the main switch 12 is actuated to its closed position, which connects conductor 17 to the direct-current supply conductor 11, and a circuit is then established from the positively energized supply conductor 17, through conductor 18, shunt field winding 15, operating coil of relay 19, field resistor 20, and conductor 21, to the negative supply conductor 11a. Upon the completion of this circuit, the shunt field winding and the operating coil of relay 19 are energized, and the relay 19 is thereby actuated to its closed position.

When the relay 19 has reached its closed position, a circuit is established which may be traced from the positively energized conductor 17, through conductors 22 and 23, the movable contact member of the control switch 24, conductor 25, the operating coil of the low-voltage relay 26, conductor 27, the contact members of the overload relay 28, the contact members of relay 19 and conductor 21 to the supply conductor 11a.

This circuit constitutes a protective system for the motor 10 in that, upon the failure of the voltage of the supply line, the low-voltage relay 26 will be insufficiently energized to retain its contact members in their closed position, so that the corresponding circuit will be interrupted and the remainder of the control apparatus will be disconnected from the source of supply, as will be described hereinafter. When an excessive current is drawn through the armature of motor 10, the overload relay 28 will be actuated to its open position and interrupt the circuit supplying energy to the low-voltage relay 26, whereby the relay 26 will be again actuated to interrupt the supply of energy to the remainder of the control apparatus, in a manner similar to that resulting from the occurrence of low voltage. The operating coil of the relay 28 is, however, so designed that the relay 28 will not be actuated to its circuit-interrupting position until a current of such a magnitude as to threaten damage to the windings of the armature of motor 10 is drawn through the operating coil. A further protective feature is provided in this circuit through the relay 19, by which it is impossible to energize the low-voltage relay 26 until the shunt field winding 15 is energized.

In order to connect the motor 10 for rotation in the forward direction, the low-voltage relay 26 being in its circuit-closing position, the control switch 24 may be moved to bridge the contact members 29 and 30 and thereby complete a circuit from the energized conductor 22, through the contact members of the low-voltage relay 26, conductors 25 and 31, contact member 29, the movable contact member of the control switch 24, contact member 30, conductor 32, the operating coil of the directional switch 13, conductor 33 and the operating coil of the line switch 34, to conductor 21 and the supply conductor 11a, thereby energizing the operating coils of the switches 13 and 34 and actuating these switches into their circuit-closing positions.

Another circuit is completed from the energized conductor 32, through conductor 35, the coil 36 of relay 37, conductor 38, the ballast resistor 39 and conductor 21, to the supply conductor 11a.

Upon the actuation of the switches 13 and 34 to their closed positions, the main-motor circuit is completed from the positively energized conductor 17, through conductor 40, contact member 41 of the switch 13, conductor 42, the armature of motor 10, the operating coil of the overload relay 28, conductor 43, contact member 44 of the directional switch 13, conductor 45, the series field winding 16, the operating coil of relay 46, the accelerating resistor 47, the contact members of the line switch 34 and conductor 21, to supply conductor 11a.

Since it is desired to start the motor 10 at a voltage of lower value than that at which it will normally operate, the accelerating resistor 47 is connected in the main-motor circuit for starting and, when the motor 10 has accelerated sufficiently to permit the application of full line voltage, the control switch 24 is moved to bridge the contact members 29, 30 and 48 and thereby complete a circuit from the energized conductor 31, through the control switch 24, contact member 48, conductor 49, the operating coil of the accelerating switch 50, and conductor 21, to supply conductor 11a, thereby energizing the operating coil of the accelerating switch 50 and actuating its contact members into their circuit-closing position to bridge the accelerating resistor 47 and apply the full line voltage to the terminals of the motor 10.

The resistor 20, which is connected in series relation with the shunt field winding 15, may be adjusted to vary the excitation of the motor 10 and thereby change its speed of rotation, and a relay 51 is provided to short-circuit the field resistor 20 and thereby permit the maximum excitation of the shunt field winding 15. The operation of the relay 51 is controlled by relays 37 and 46, whereby, under certain conditions, the relay 51 will be energized to permit the maximum excitation of the shunt field winding 15 and, at other times, the relay 51 will be released to permit the minimum excitation of the shunt field winding 15.

The operating coil of the relay 46 is connected in series with the motor 10 and is so designed that its actuation occurs when the motor current exceeds a predetermined magnitude. In this manner, when the motor current exceeds a certain value, the relay 46 operates to close the contacts associated with it. If, during the operation of the relay 46, the contacts of the relay 37 are closed, a circuit is established for the operating coil of the relay 51, thereby causing an increase in excitation of the shunt field winding 15 by shunting the resistor 20.

The relay 37 is provided with four operating coils 36, 52, 53 and 54. It is to be noted that the coils 53 and 54 are connected in series-circuit relation to each other and in parallel-circuit relation to the armature of the motor 10 and are so wound that their magnetic effect is always additive. The operating coil 36 is connected in parallel-circuit relation to the operating coil of the forward-directional switch 13, whereas the operating coil 52 is connected in parallel-circuit relation to the operating coil of the reverse-directional switch 14. In series-circuit relation to the respective coils 36 and 52, are ballast resistors 39 and 59.

When the movable member of the master switch 24 has been moved to a position to bridge contact fingers 29, 30 and 48, the forward-directional switch 13 is caused to operate, as above explained, and voltage is impressed across the coils 53 and 54, and a magnetic effect upon the armature 37 is set up which is in the direction of the arrow F, shown adjacent to these coils. At the same instant that the operating coil of the directional switch 13 is energized, coil 36 is also energized, but the magnetic effect of this coil is in opposition to the magnetic effect of coils 53 and 54, as is shown by the arrow F adjacent to coil 36. During this stage of operation, coil 52 is not energized at all, since contact fingers 56 and 64 are not bridged.

The relay 37 is so designed that its armature moves to open the contacts of the relay only when no less than three coils are energized in such manner that their magnetic effect is additive.

From the foregoing discussion, it will be apparent that, during acceleration and normal operation in the forward direction, relay 37 will not operate to open its contacts. The control of rheostat-shunting relay 51 is thus subject entirely to the controlling operation of relay 46. Relay 46 is usually set for some predetermined over-load, which over-load is, of course, less than the over-load for which relay 28 is adjusted to operate. If a temporary heavy current is drawn from the line, as would always be the case during acceleration, relay 46 closes its contacts, relay 51 is operated, and the shunt-field rheostat 20 is shunted, thereby producing a heavy shunt field during the initial stages of acceleration. When the motor has accelerated to a given percent of normal full-load speed, the current through operating coil 46 drops, the contacts of relay 46 open, the operating coil 51 is deenergized and, in consequence, the excitation for the shunt field is decreased. The motor, therefore, rapidly attains normal full-speed operation. When the motor 10 is operating at normal speed and a temporary heavy load occurs, the relay 46 operates, and, in consequence, through relay 51, causes a heavy field excitation. The motor 10 thus develops the necessary torque to carry the temporary heavy load.

When the motor 10 is operating in the forward direction, the coils 36, 53 and 54 of relay 37 will be energized, but the magnetic effect of coil 36 is in opposition to the magnetic effect of coils 53 and 54 and, in consequence, the contacts of relay 37 remain closed. If the attendant desires to reverse the operation of the motor, he moves the arm of the master controller 24 to bridge contact fingers 55 and 56. Movement of the controller to the mentioned position causes interruption of the circuit for the operating coils of the forward directional switch 13 and the line switch 34 and the coil 36 of the relay 37. At the same time, circuits are established from line conductor 11, through conductors 17 and 22, contact members of low-voltage relay 26, conductor 25, contact fingers 55 and 56—bridged by the movable control member—conductor 57, operating coil of the reverse-directional switch 14, conductor 33 and operating coil of the line contactor 34, to the other line conductor 11a. A circuit is also established from the energized conductor 57, through coil 52 of the relay 37, conductor 58, ballast resistor 59 and conductor 21, to the line conductor 11a. Energization of coil 52 produces a magnetic effect in the direction indicated by the arrow adjacent to coil 52.

Upon interruption of the circuit to the operating coil of the switch 13, the contact members 41 and 44 are released to their open positions, and the armature of the motor 10 is disconnected from the source of supply. However, the armature of the motor 10 continues to rotate in the same direction and, during this rotation, a counter-electromotive force continues to be generated which energizes the coils 53 and 54 of the relay 37 in the same direction that they were energized when the motor 10 was connected to the source of supply through the forward directional switch 13. It will be noted that the coils 52, 53 and 54 of the relay 37 are now energized and that their effect is cumulative so that the relay 37 will be actuated to its open or circuit-interrupting position. In a similar manner, when the motor 10 is operating in the reverse direction, the control switch 24 may be thrown into the position at which the coil 36 will be energized and, while the motor 10 continues to rotate in the original direction, the effect of the coils 36, 53 and 54 will be cumulative, and the relay 37 will be actuated to its open position.

When the control switch 24 is thrown into the position where it bridges the contact members 55 and 56, the reverse directional switch is actuated to its closed position, so that a circuit is established from the energized conductor 17, through conductor 60, contact member 61 of the switch 14, the operating coil of the overload relay 28, the armature of motor 10, conductor 62, contact member 63 of the directional switch 14, conductor 45, series field winding 16, the operating coil of relay 46, the accelerating resistor 47, and contact members of line switch 34, to supply conductor 11a. Since the accelerating resistor 47 is connected in this circuit, the voltage applied to the terminals of the armature of motor 10 by the establishment of this circuit is considerably less than the counter-electromotive force which is being generated by the rotation of the armature of motor 10, in its original direction, under the effect of the shunt field winding 15. In this way, the coils 53 and 54 of the relay 37 are energized in their original direction only so long as the counter-electromotive force generated by the armature of motor 10 is in excess of the voltage applied to the terminals of the armature through the connections to the source of the supply by the reverse directional switch 14. Therefore, the relay 37 will remain in its open position only so long as the magnetic flux produced by the coils 53 and 54 does not reverse and overcome or oppose the flux developed by the coil 52, so that the relay 37 will be released to its circuit-closing position when the differential action between these two fluxes occurs.

During plugging operation, the armature current will, of necessity, be high, and the contacts of relay 46 will be closed, but that will not cause relay 51 to operate, since the plugging relay 37 opens its contacts during plugging. During plugging, the field excitation of the motor will thus be determined by the setting of the rheostat 20, regardless of the position of relay 46, while, during initial stages of acceleration, either in the forward direction or in the reverse direction, or while a temporary heavy load is imposed on the motor, regardless of the direction of its operation, the relay 51 will be energized, and the field excitation will be increased in a desirable manner.

When the speed of rotation of the motor 10 in the original direction has been retarded to zero, and the motor has begun its acceleration in the direction corresponding to its new circuit connections, the control switch 24 may be moved to bridge the contact members 55, 56 and 64 and thereby complete a circuit from the energized conductor 25, through contact members 55 and 64, conductor 49, the operating coil of accelerating switch 50 and conductor 21, to supply conductor 11a, thereby actuating the accelerating switch 50 to its circuit-closing position, short-circuiting the accelerating resistor 47 and connecting the full line voltage across the terminals of the motor 10. The motor 10 may continue its operation in the reverse direction and may be plugged from high speed in this direction to operate in the forward direction in a manner similar to that described above for plugging from high speed in the forward direction to operate in the reverse direction of rotation.

When plugging connections are established in a motor circuit, the field excitation of the motor should not be greater than that under which it has been operating, in order to prevent the occurrence of an excessively high voltage, which would result from the counter-electromotive force generated in the armature of the motor being cumulative with the voltage of the supply line, as newly connected to the terminals of the motor. The function of this relay 37 is to prevent increasing the excitation of the shunt field winding 15 after the control switch 24 is moved from the position in which it bridged the contact members 29 and 30 to the position in which it bridged contacts 55 and 56, until the counter-electromotive force generated in the armature has been reduced to zero and the direction of rotation reversed.

In order to prevent increasing the excitation of the shunt field winding 15, the circuit supplying energy to the operating coil 51 is interrupted by operation of relay 37, as above explained, whereupon the relay 51 is released to its circuit-interrupting position and the field resistor 20 is thus connected in series relation with the shunt field winding 15, thereby maintaining the magnitude of the current flowing in that circuit. The circuit for supplying energy to the relay 51 is controlled by the relays 37 and 46 and may be traced from the positively energized conductor 17, through conductors 60 and 65, the contact member of relay 37, conductor 66, the contact member of relay 46, the operating coil of relay 51 and conductor 21, to supply conductor 11a, so that when either relay 37 or relay 46 is in its circuit-interrupting position, the field resistor 20 is connected in circuit with the shunt field winding 15, and the excitation is at a magnitude determined by the setting of the resistor 20.

Since it will be possible to modify the embodiment set forth without departing from the spirit and scope of my invention, it is desired that the foregoing description be construed as entirely illustrative and not in a limiting sense.

I claim as my invention:

1. The combination in a system of control, a reversible motor, means for plugging the motor and means responsive to the current traversing the armature of said motor for accelerating the motor, and means responsive to the armature terminal voltage during the plugging operation for rendering said accelerating means inoperative.

2. In a control system for reversing a motor, a reversible motor, a pair of directional coils disposed to operate switches for respectively connecting the motor to rotate in a corresponding direction, a relay having a plurality of operating coils, two of said relay-operating coils being connected in parallel relation to the respective directional coils, whereby only one of said relay-operating coils may be energized at one time, the remainder of said relay-operating coils being connected in parallel relation to the armature of said motor, the effect of the first-mentioned relay-operating coils being normally differential with the effect of the last-mentioned relay-operating coils, said relay being operable only when the resultant force of the operating coils is equivalent to the cumulative force exerted by said operating coils connected in parallel relation to the armature and one or the other of said coils disposed in parallel relation to said directional coils.

3. In combination with a motor having an armature and a shunt field winding, a source of power, means for connecting the motor to said source of power to operate either in a forward or in a reverse direction, control means for controlling the current of the shunt field winding, means responsive to current traversing the motor armature for controlling the field-current control means, and means responsive to a reversal of the armature terminal voltage while the armature continues its rotation in the original direction for also controlling the field-current controlling means.

4. In a system of control, a reversible motor having an armature and a shunt field winding, means for plugging said motor, means responsive to the counter-electromotive-force of the motor during plugging operation for preventing an increase in the excitation of the field winding during such operation, and means for restoring the full field excitation after the direction of rotation of the motor reverses.

5. The combination in a motor control system of a reversible motor having a shunt field winding, means for plugging the motor, field-controlling means for controlling the excitation of the shunt field winding to control the acceleration of the motor, and means responsive to the armature current and the armature terminal voltage for controlling said field-controlling means.

6. The combination in a motor control system of a reversible motor having a shunt field winding, means for plugging the motor, means responsive to the current traversing the armature of said motor for controlling the excitation of the shunt field winding to control the acceleration of the motor, and means responsive to the armature terminal voltage during the plugging operation for rendering said field-controlling means inoperative.

In testimony whereof, I have hereunto subscribed my name this 20th day of March, 1928.

HAROLD C. JENKS.